June 22, 1937. R. M. ALLEN 2,084,932
AUXILIARY ACCELERATOR CONTROL
Filed June 11, 1936

INVENTOR.
ROLLIN M. ALLEN
BY M. Falbert Dick
ATTORNEY.

Patented June 22, 1937

2,084,932

UNITED STATES PATENT OFFICE 2,084,932

AUXILIARY ACCELERATOR CONTROL

Rollin M. Allen, Marshalltown, Iowa

Application June 11, 1936, Serial No. 84,701

2 Claims. (Cl. 74—482)

The principal object of my invention is to provide an auxiliary acceleration control for automotive vehicles that will allow the driver of the vehicle to use his left foot in the operation of the accelerator control at times to reduce the fatigue of constantly driving a vehicle with the right foot.

A further object of my invention is to provide an auxiliary carburetor accelerator control that increases the leverage on the controlling member and provides greater smoothness and controllability of the action on the foot operated pedal member.

A still further object of this invention is to provide an auxiliary accelerator control for automotive vehicles that may be easily and quickly installed or removed and when installed will not affect the normal operation of the standard accelerator control pedal.

A still further object of my invention is to provide an accelerator control that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
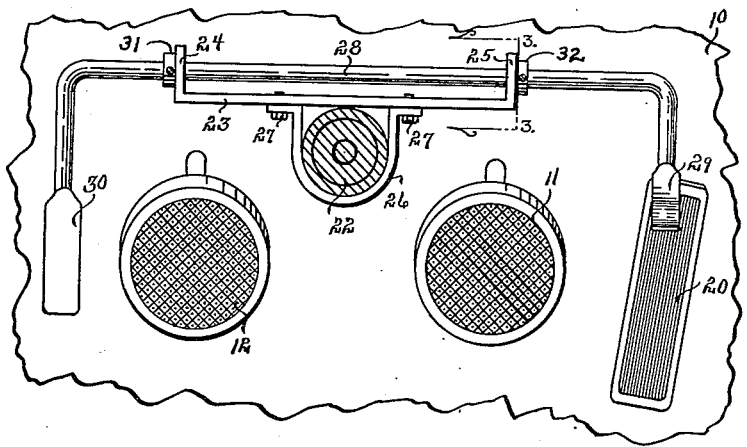
Fig. 1 is a top plan view of my device ready for use and installed on an automotive vehicle.

It is the general practice to control the flow of fuel through the carburetor of a vehicle by the use of a foot operated pedal member, positioned within the driver's compartment of the vehicle, and designed to be operated by the right foot of the driver. This type makes it imperative that the right foot be used exclusively in the control of the speed of the vehicle. On long drives the keeping of the right foot in the same position and constantly depressing the accelerator control imposes a great amount of fatigue and strain on the driver. Furthermore, due to the construction of the accelerator control pedal, the action of the pedal is too short to give smoothness of control and appropriate leverage on the controlling member.

I have overcome all of the above objections with my auxiliary accelerator control and introduced many other advantages as will be apparent and as are hereinafter enumerated.

Referring to the drawing I have used the numeral 10 to designate the ordinary floor boards and body of an automotive vehicle. The numerals 11 and 12 indicate, respectively, the common brake and clutch operating pedals of the vehicle. I have used the numeral 13 to designate the motor of the vehicle which has a common type carburetor 14.

Figure 2:
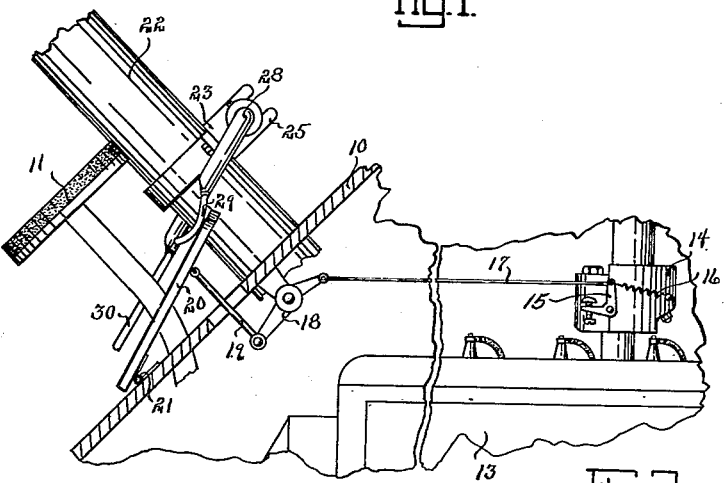
Fig. 2 is a side view of my device installed on an automotive vehicle and more fully illustrates its construction, and operation.
Figure 3:
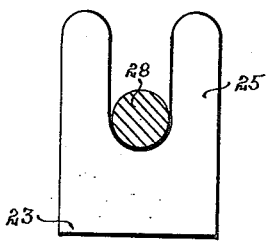
Fig. 3 is an enlarged view of one end of the bracket member of the device showing the forked bearing and is taken on the line 3—3 of Fig. 1.

This carburetor has the usual control and stop lever 15 and return spring 16 for operating the same. The numeral 17 indicates the usual control rod having one end operatively secured to the lever 15, extending rearwardly, and having its other end pivotally secured to one arm of the usual toggle lever 18. The numeral 19 designates a rod having one end pivotally secured to the other arm of the toggle lever 18, extending upwardly and rearwardly through a slot in the floor board and having its other end pivotally secured to the usual standard accelerator pedal 20, as shown in Fig. 2 of the drawing. The pedal 20 is of the ordinary elongated foot rest type and is hingedly secured to the floor boards of the vehicle in the usual manner by a hinge or like 21.

I have used the numeral 22 to designate the common steering column of an automobile or like which extends upwardly and rearwardly in the usual manner and is located between and slightly forward of the pedals 11 and 12.

I have used the numeral 23 to designate the elongated supporting bracket of my device. This bracket 23 has each of its end portions bent forward at right angles to form forked bearings 24 and 25 as shown in the drawing. The numeral 26 indicates a clamp designed to be fitted about the steering column 22 and secured to the back center of the bracket 23 by stud bolts or like 27, for holding the bracket 23 rigidly in position relative to the steering column 22.

I have used the numeral 28 to designate an elongated control rod or element having its center portion rotatably and detachably mounted in the fork bearings of the bracket 23. The right end portion of the rod 28 is bent to the rear at a right angle and has its end flattened and curved upwardly to form a contact member 29 which rests, due to its weight, against the upper end surface of the control pedal 20, as shown in the drawing.

The left end portion of the rod 28 is also bent to the rear at a right angle, approximately parallel to the end upon which is formed the member 29, and terminates in an integrally formed elongated and widened pedal 30 as shown in Fig. 1 of the drawing. The rod 28 is of such a length that the member 29 may be in operative contact with the pedal 20, and the foot pedal 30 will be positioned to the left of the clutch pedal 12 and in a position that may be readily assumed by the left foot of an operator in driving a vehicle.

The numerals 31 and 32 designate two collars which may be secured by set screws or the like to the rod 28 adjacent the forked bearings formed on the bracket 23 for holding the rod 28 in proper alignment and preventing its longitudinal sliding relative to the bracket 23. It will here be noted that the rod 28 merely rests in the fork bearings of the bracket 23 in such a manner that the rod 28 may be easily disengaged when desired, but will maintain its position due to the upward angle of the forked bearings 24 and 25 and the weight of the rod 28 with its attendant lever arms or operating members 28 and 30.

In practical operation the bracket 23 is firmly secured to the steering column of the vehicle by the clamp 26 and bolts 27 at such a height from the floorboards of the vehicle as to allow the bent portion of the rod 28, adjacent the member 29 to have its longitudinal axis approximately parallel to the face surface of the pedal 20. Due to the steering column extending upwardly and rearwardly the forked bearings will extend upwardly and forwardly. The rod 28 is slid within the bracket until it is in proper alignment and the collars 31 and 32 are then secured to the rod adjacent the forked bearings 24 and 25, respectively.

By pressing downwardly on the pedal 30, the rod 28 will rotate in the bearings and the member 29 will force the standard pedal 20 downwardly thereby increasing the flow of gas through the carburetor 14 for increasing the speed of the motor. As the pedal 30 extends a greater distance from the rod 28 than the member 29 the leverage applied to the rod 19 will be compounded through the pedal 20. Also the pedal 30 will have to be depressed a relatively greater amount than will the pedal 20 to obtain the same amount of acceleration, thereby making the control vernier in action and smoother in control. By the member 29 being curved a minimum of friction will be had between the member and the pedal 20, due to the fact that the member 29 will rock or roll over the surface of the pedal 20 and exert a cam action against it. When the pedal 30 is released, the spring 16 will force the pedal 20 upwardly thus pushing the member 29 upwardly to a normal position.

When it is not necessary to use the device, such as in driving about town and on short trips, the rod 28 can merely be lifted out of the forked bearings 24 and 25 and the rod 28, with its attendant pedal 30 and contact member 29, can be placed away until it is desired to use it.

From the foregoing it will be seen that I have provided an auxiliary accelerator control for automotive vehicles that allows the driver to use either his right or left foot in the operation of the vehicle, that is smooth and vernier in action, simple in construction, and installation, and which may be easily and quickly disconnected without the use of tools.

Some changes may be made in the construction and arrangement of my improved auxiliary accelerator control without departing from the real spirit and purpose of my invention, and it is my intention to cover by my claims any modified forms of structure or use of mechanical equivalents which may be reasonably included within their scope.

I claim:

1. In combination with an automotive vehicle having a steering column in the driver's compartment, a foot operated accelerator pedal positioned to one side of said steering column and capable of accelerating the flow of gas through the carburetor of said vehicle when depressed and a spring for yieldingly holding said accelerator pedal in a neutral position, an auxiliary accelerator control comprising, an elongated bracket secured to said steering column and running transversely to the longitudinal axis of said steering column, forked bearing members formed on each end of said bracket and extending in an upwardly direction therefrom, an elongated rod designed to be detachably rotatably mounted in said forked bearing members, a means for preventing the sliding movement of said rod relative to said bracket, a contact member on one end of said rod capable of operatively engaging said accelerator pedal, and a foot operated lever on the other end of said rod of greater length than said contact member and positioned on the other side of said steering column from said accelerator pedal; said contact member operating said pedal when said lever is actuated.

2. In combination with an automotive vehicle having a depressible member positioned within the driver's compartment of the vehicle for accelerating the motor of said vehicle and positioned to be operated by the right foot of the driver of the vehicle, an auxiliary accelerator control, comprising, a bearing bracket rigidly secured within the driving compartment of said vehicle having its two ends extending upwardly and forwardly, a receiving notch in each end of said bearing bracket, and an inverted U-shaped element having its center portion rotatably rested in the receiving notches in the end of said bearing bracket; said last mentioned member having one of its ends positioned for actuation by the left foot of the driver of the vehicle and its other end in engagement with said depressible member.

ROLLIN M. ALLEN.